US012099924B2

(12) United States Patent
Chockalingapuramravindran

(10) Patent No.: US 12,099,924 B2
(45) Date of Patent: Sep. 24, 2024

(54) QUANTIFYING REWARD AND RESOURCE ALLOCATION FOR CONCURRENT PARTIAL DEEP LEARNING WORKLOADS IN MULTI CORE ENVIRONMENTS

(71) Applicant: QUALCOMM Incorporated, San Diego, CA (US)

(72) Inventor: Rajeswaran Chockalingapuramravindran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 984 days.

(21) Appl. No.: 17/062,444

(22) Filed: Oct. 2, 2020

(65) Prior Publication Data

US 2022/0108165 A1 Apr. 7, 2022

(51) Int. Cl.
*G06N 3/08* (2023.01)
*G06F 9/50* (2006.01)

(52) U.S. Cl.
CPC ............ *G06N 3/08* (2013.01); *G06F 9/5027* (2013.01)

(58) Field of Classification Search
CPC ........................................................ G06N 3/08
See application file for complete search history.

(56) References Cited

U.S. PATENT DOCUMENTS

| | | | | |
|---|---|---|---|---|
| 10,235,625 | B1 * | 3/2019 | Walters | G06N 3/04 |
| 2019/0187963 | A1 * | 6/2019 | Bokhari | G06F 8/35 |
| 2019/0266014 | A1 * | 8/2019 | Bahl | G06N 20/00 |
| 2019/0266015 | A1 | 8/2019 | Chandra et al. | |

* cited by examiner

*Primary Examiner* — Alan Chen
(74) *Attorney, Agent, or Firm* — QUALCOMM Incorporated

(57) ABSTRACT

A method for operating an artificial neural network (ANN) includes quantifying a reward for executing ANN tasks in a system having multiple processing cores. A set of processing cores of the multiple processing cores is allocated to execute each of the tasks based on the reward. The ANN tasks are executed concurrently according to the processing core allocation to operate the ANN.

15 Claims, 7 Drawing Sheets

600

602
QUANTIFY A REWARD FOR EXECUTING ARTIFICIAL NEURAL NETWORK (ANN) TASKS IN A SYSTEM HAVING MULTIPLE PROCESSING CORES

604
ALLOCATE A SET OF PROCESSING CORES OF THE MULTIPLE PROCESSING CORES TO EXECUTE EACH OF THE ANN TASKS BASED ON THE REWARD

606
EXECUTE THE ANN TASKS ACCORDING TO THE PROCESSING CORE ALLOCATION TO OPERATE THE ANN

QUANTIFYING REWARD AND RESOURCE ALLOCATION FOR CONCURRENT PARTIAL DEEP LEARNING WORKLOADS IN MULTI CORE ENVIRONMENTS

BACKGROUND

Field

Aspects of the present disclosure generally relate to neural networks, and more particularly, to resource allocation for concurrent partial deep learning workloads in a multi-core processing environment.

Background

Artificial neural networks may comprise interconnected groups of artificial neurons (e.g., neuron models). The artificial neural network may be a computational device or represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs) such as deep convolutional neural networks (DCNs) have numerous applications. In particular, these neural network architectures are used in various technologies, such as image recognition, pattern recognition, speech recognition, autonomous driving, and other classification tasks.

Neural networks consist of operands that consume tensors and produce tensors. Neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

To improve the speed of processing, parallel processing techniques have been applied. Multiple hardware accelerators or processing core devices have been designed to parallelize and share the inference execution load of these deep neural networks. However, deep learning workloads may be characterized by different patterns of layers (partial workload) executing back-to-back to complete a learning task. Unfortunately, such partial workloads (patterns) may be characterized by a bottleneck layer at the output.

SUMMARY

Various aspects of the present disclosure are directed to an apparatus including means for quantifying a reward for executing ANN tasks in a system having multiple processing cores. The apparatus also includes means for allocating a set of processing cores of the multiple processing cores to execute each of the ANN tasks based on the reward. The apparatus further includes means for executing the ANN tasks according to the processing core allocation to operate the ANN.

In some aspects of the present disclosure, a non-transitory computer-readable medium with non-transitory program code recorded thereon is disclosed. The program code is executed by a processor and includes program code to quantify a reward for executing ANN tasks in a system having multiple processing cores. The program code also includes program code to allocate a set of processing cores of the multiple processing cores to execute each of the ANN tasks based on the reward. The program code further includes program code to execute the ANN tasks according to the processing core allocation to operate the ANN.

Various aspects of the present disclosure are directed to an apparatus having at least one memory and one or more processors coupled to the at least one memory. The processor(s) is configured to quantify a reward for executing ANN tasks in a system having multiple processing cores. The processor(s) is also configured to allocate a set of processing cores of the multiple processing cores to execute each of the ANN tasks based on the reward. The processor(s) is further configured to execute the ANN tasks according to the processing core allocation to operate the ANN.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
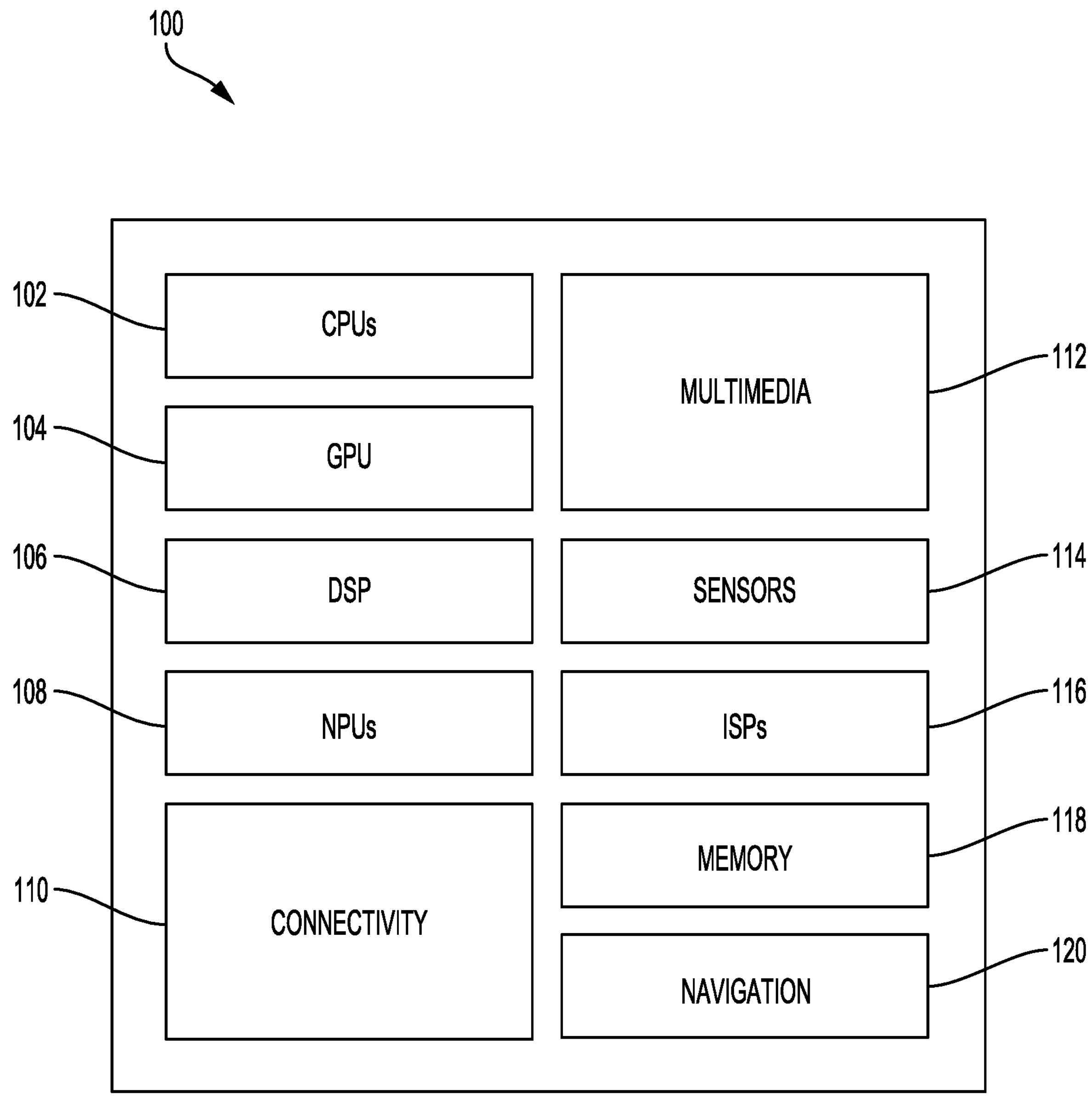
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word “exemplary” is used to mean “serving as an example, instance, or illustration.” Any aspect described as “exemplary” is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Artificial neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

To improve the speed of processing, parallel processing techniques have been applied. Multiple hardware accelerators or processing core devices have been designed to parallelize and share the inference execution load of these deep neural networks. However, deep learning workloads may be characterized by different patterns of layers (partial workload) executing back-to-back to complete a learning task. Unfortunately, such deep learning workloads may be characterized by a bottleneck layer at the output.

Aspects of the present disclosure are directed to quantifying a reward that is accrued by executing artificial neural network (ANN) tasks in a multi-core environment. An ANN task may include a workload or partial workload for operating the ANN, for example. A partial workload may include a set of dependent operations in the ANN. Such operations may include operations performed in a convolution layer, a pooling layer, or a fully connected layer. Each partial workload may be independent. In some aspects, where a partial workload depends on another partial workload, such partial workloads may be fused and treated as a single partial workload. On the other hand, a workload may include operations for all layers of the ANN.

In accordance with aspects of the present disclosure, a reward may be quantified and used to drive an allocation decision. That is, a quantity may be determined to characterize a benefit that may be realized for a resource allocation. A reward function may be determined and used to calculate a reward value for a given allocation. For instance, in some aspects, a reward value may be calculated for each unit increase of processing cores allocated to execute each of the ANN tasks (e.g., partial workload or whole workload). The reward for each of the ANN tasks may be compared and employed to determine an improved allocation of resources (e.g., processing cores) to concurrently execute the ANN tasks. In some aspects, an improved or even optimal allocation of resources (e.g., processing cores) may be determined based on the quantified reward.

FIG. 1 illustrates an example implementation of a system-on-a-chip (SOC) 100, which may include a central processing unit (CPU) 102 or a multi-core CPU configured for operating an artificial neural network (e.g., a neural end-to-end network). Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to quantify a reward for executing artificial neural network (ANN) tasks in a system having multiple processing cores. The general-purpose processor 102 may also include code to allocate a set of processing cores of the multiple processing cores to execute each of the tasks based on the reward. The general-purpose processor 102 may further include code to execute the ANN tasks according to the processing core allocation to operate the ANN.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
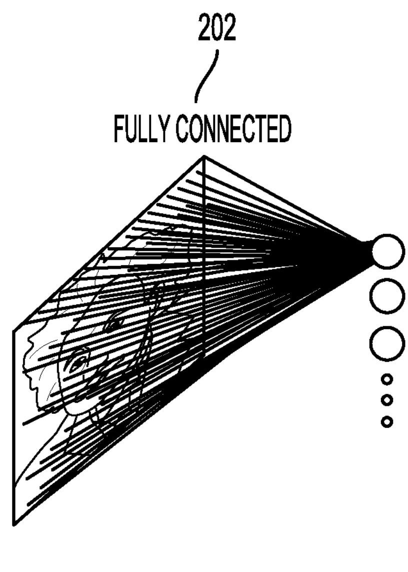
FIGS. 2A, 2B, and 2C are diagrams illustrating a neural network in accordance with aspects of the present disclosure.
Figure 2B:
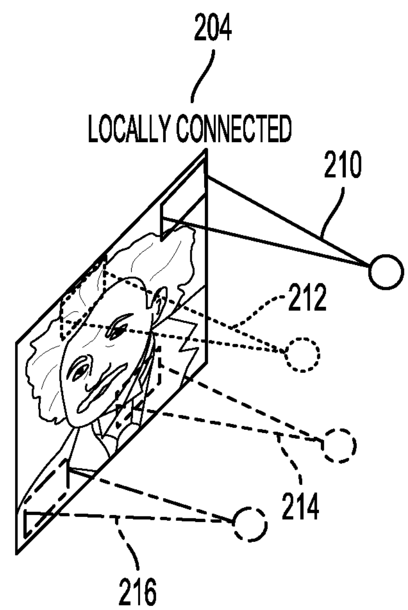

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
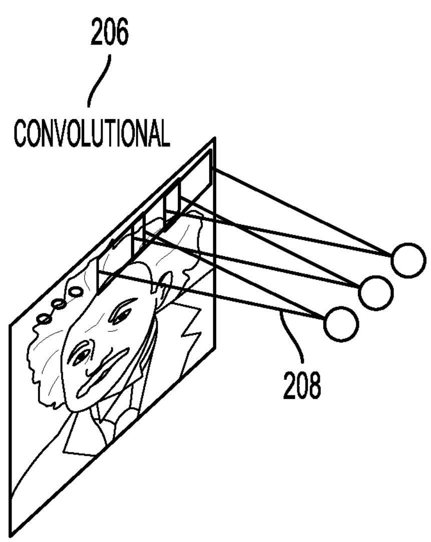

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
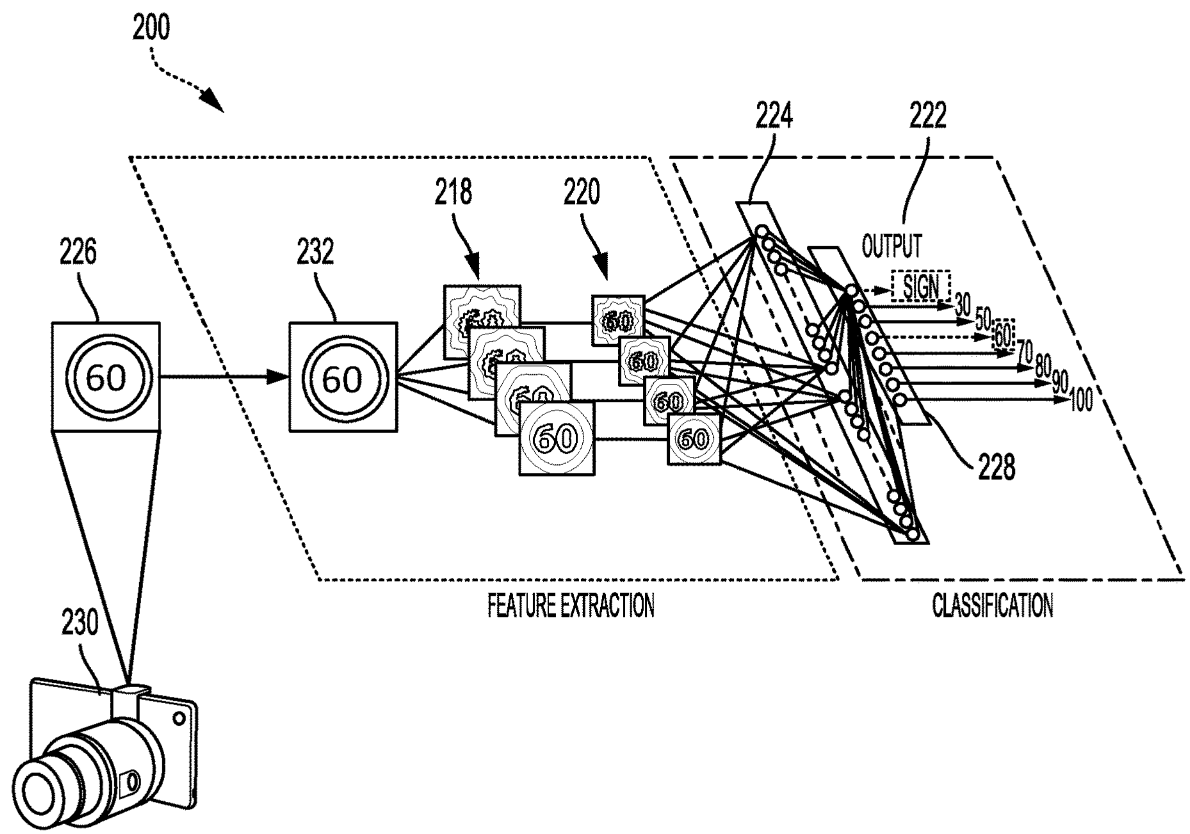
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
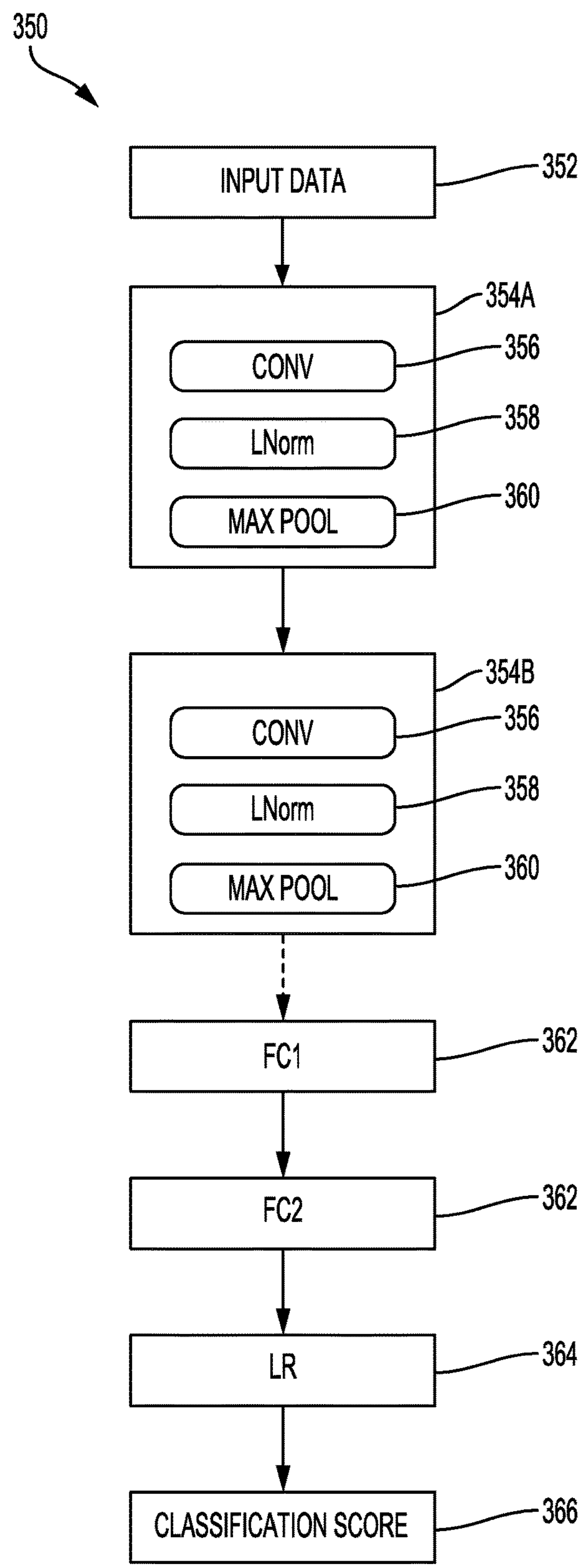
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
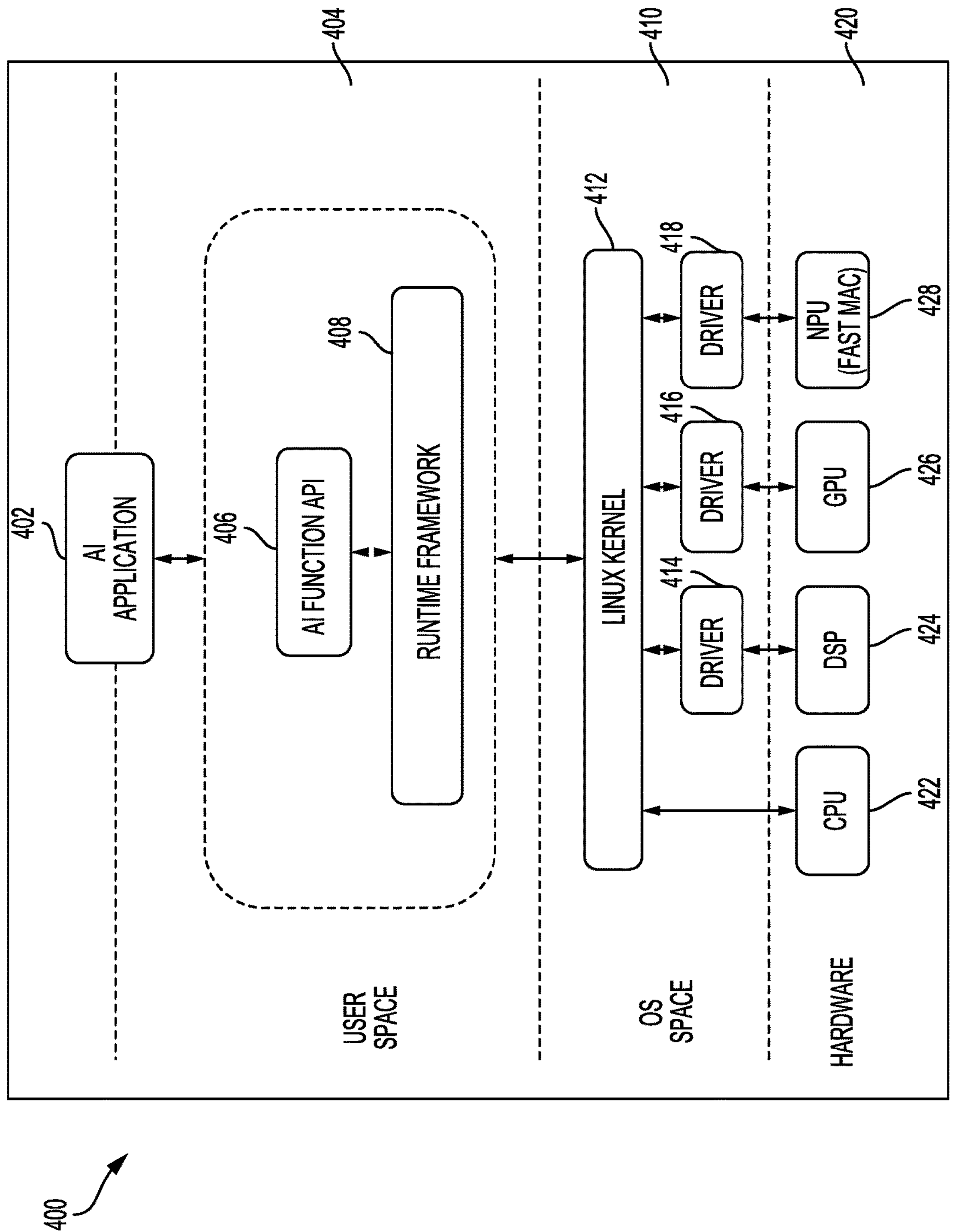
FIG. 4 is a block diagram illustrating an exemplary software architecture that may modularize artificial intelligence (AI) functions.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Linux Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

Aspects of the present disclosure are directed to allocating resources (e.g., cores) to execute artificial neural network (ANN) tasks. The resources may include processing cores, artificial intelligence (AI) accelerators, in-memory computing architectures, or other specialized processors for executing an ANN, for example. The ANN tasks may include the execution of a workload, which may be a set of operations to be executed to determine an inference based on a given input. In some aspects, workloads may be split into partial workloads (e.g., a set of operations for one or more layers of the ANN). The partial workloads may be independent from each other. However, where a workload cannot be split into partial workloads (e.g., dependencies exist between partial workloads), the whole workload or workload for the entire ANN may be used. By using a reward function, the resources for executing workloads of an ANN may be allocated to reduce execution bottlenecks.

In accordance with aspects of the present disclosure, given a set of N cores to execute concurrent deep learning tasks, resources (e.g., processing cores of a multi-core system) may be allocated based on a quantified reward. In doing so, the speed and efficiency of performing ANN tasks may be improved. In some aspects, the allocation of processing cores for concurrently executing such deep learning tasks may be improved or even optimized based on the highest reward or overall speedup per allocated resource.

A reward function for executing a workload may be computed based on a speedup increase for executing a workload using a set of resources (e.g., processing cores or AI accelerators). In other words, the speedup may be the relative reduction in execution time for an additional allocated resource. In one example, the speedup increase for executing an ANN task (e.g., a partial workload) may be given by:

$$\text{Speedup}\,(p, N) = 1 - \frac{ACT(p, N)}{\text{Baseline}(p)}, \tag{1}$$

where ACT corresponds to the actual execution time, p represents the task, and N represents the number of allocated resources.

The reward function for each ANN task may in turn be determined using the calculated speedup values. For example, the reward function may be determined using curve fitting techniques or the like. In some aspects, a reward value may be computed by differentiating the change in speedup relative to the change in the number of resources N.

For instance, the reward function for task p may be expressed as:

$$\text{reward} = \frac{\Delta\text{speedup}}{\Delta N}. \tag{2}$$

The reward for each task (e.g., partial workload) to be executed may be compared for each unit increase in the number of resources N. Additional resources beyond the baseline level (e.g., executing using a single core) may be assigned for executing a task (e.g., partial workload) based on descending order of the rewards accrued.

In some aspects, a reward may be recalculated after each allocation. The allocation of further resources may be performed. Furthermore, this process of calculating the reward and allocating additional resource may be repeated until a target number of resources (e.g., all resources or a predefined number of resources) are allocated. By performing such reward-aware allocation of resources to workloads (e.g., partial workloads), increased speed and efficiency of execution of workload of an ANN may be achieved.

Figure 5:
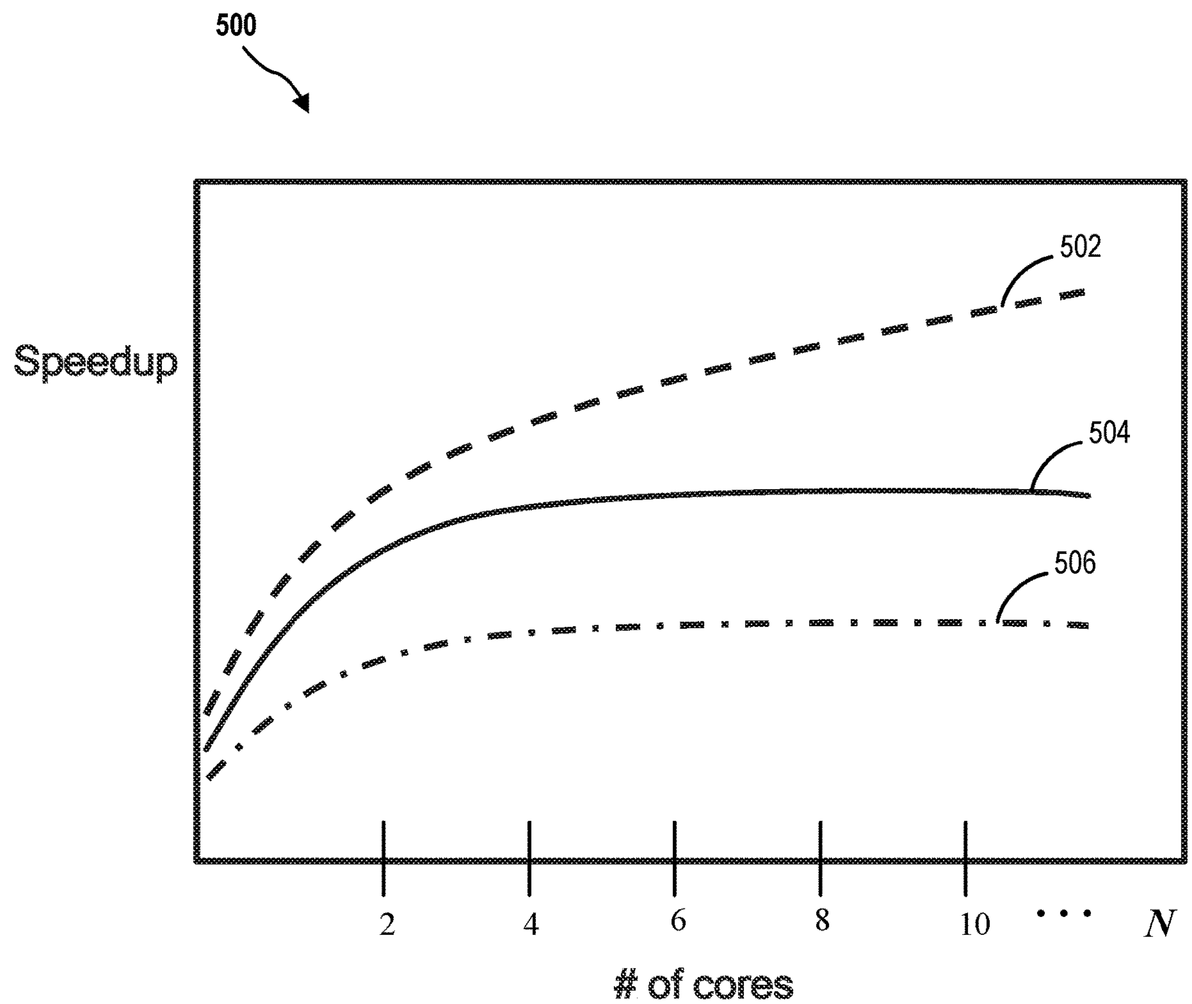
FIG. 5 is a graph illustrating an example of execution speedup for artificial neural network (ANN) tasks with unit increases in resources, in accordance with aspects of the present disclosure.

FIG. 5 is a graph 500 illustrating an example of execution speedup for ANN tasks with unit increases in resources in accordance with aspects of the present disclosure. Referring to the example of FIG. 5, curves 502, 504, 506 represent the reward functions for performing a task 1, task 2, and task 3, respectively. Curves 502, 504, and 506 may be constructed by applying curve fitting techniques to a set of data points for the speedup in executing each of the tasks with incremental change in the number of allocated processing cores. As indicated in Equation 2, the reward value for each of the tasks may be calculated by determining the slope of the corresponding curves (e.g., 502, 504, and 506). In the example of FIG. 5, allocating an additional processing core for each of the tasks (from one processing core to two processing cores) produced an increase in speedup. However, as additional resources are allocated for executing for tasks 2 (curve 504) and task 3 (curve 506), the increase in speedup is minimal. That is, allocating more than two processing cores for executing task 3 (curve 506) produced minimal gain in speedup. Similarly, allocating more than four processing cores for executing task 2 (curve 504) produced minimal gain in speedup. On the other hand, allocating additional processing cores to execute task 1 (curve 502) results in further increases in speedup. In other words, the reward value continues to increase.

Considering the example of FIG. 5, the rewards for each of the tasks may be compared and used for allocating processing cores. Accordingly, where a system has sixteen (16) processing cores, for example, ten processing cores may be allocated for task 1, four processing core may be allocated for task 2 and two processing cores may be allocated for task 3.

Figure 6:
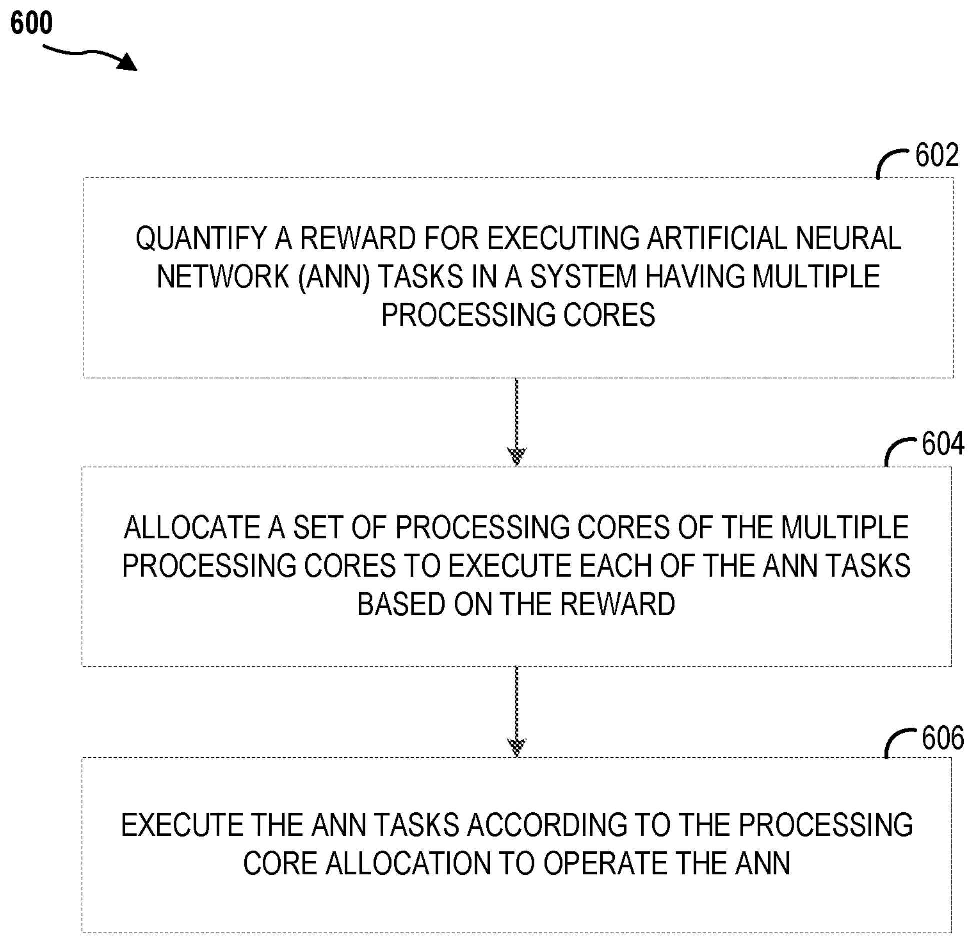
FIG. 6 illustrates a method for operating an artificial neural network, in accordance with aspects of the present disclosure.

FIG. 6 illustrates a method 600 for operating an artificial neural network, in accordance with aspects of the present disclosure. As shown in FIG. 6, at block 602, the method 600 includes quantifying a reward for executing artificial neural network (ANN) tasks in a system having multiple processing cores. An ANN task may include a workload or partial workload for operating the ANN. A partial workload may include a set of dependent operations in the ANN. Such operations may include operations performed in a convolution layer, a pooling layer, or a fully connected layer. Each partial workload may be independent of other partial workloads. In some aspects, where a partial workload depends on another partial workload, such partial workloads may be fused and treated as a single partial workload. On the other hand, a workload may include operations for all layers of the ANN. Furthermore, the ANN tasks may be executed by processing cores such as the NPU 108, for example.

As discussed above and with reference to FIG. 5, a reward function for executing a task (e.g., a partial workload) may be quantified based on a speedup increase for executing a workload using a set of resources (e.g., processing cores). In one example, the reward function may be determined using curve fitting techniques or the like. A reward value may, in turn, be computed by differentiating the change in speedup relative to the change in the number of resources N as indicated in Equation 2.

At block 604, the method 600 allocates a set of processing cores of the multiple processing cores to execute each of the tasks based on the reward. As described with reference to FIG. 5, the reward for each of three tasks are compared. In this example, allocating an additional processing core for each of the tasks (from one processing core to two processing cores) produced an increase in speedup. However, as additional resources are allocated for executing task 2 (curve 504) and task 3 (curve 506), the increase in speedup is minimal. Similarly, allocating more than four processing cores for executing task 2 (curve 504) produced minimal gain in speedup. On the other hand, allocating additional processing cores to execute task 1 (curve 502) results in further increases in speedup. In other words, the reward value continues to increase. The system processing cores are allocated based on the reward. In some aspects, the reward for each task may be placed in descending order and the system processing cores allocated correspondingly. Thus, in an example system having sixteen processing cores, ten processing cores are allocated for task 1, four processing core are allocated for task 2 and two processing cores are allocated for task 3.

At block 606, the method 600 executes the ANN tasks according to the resource allocation to operate the ANN. As discussed with reference to FIG. 5, task 1 is executed using the ten allocated processing cores, task 2 is executed using the four allocated processing cores and task 3 is executed using the two allocated processing cores. In some aspects, the ANN tasks may be executed concurrently. Additionally, the reward may be recalculated after each allocation.

In one aspect, the quantifying means, the allocating means, and executing means, and/or the training means may be the CPU 102, program memory associated with the CPU 102, the dedicated memory block 118, fully connected layers 362, NPU 428 and or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray R disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method for operating an artificial neural network (ANN), comprising:

quantifying a reward for executing ANN tasks in a system having resources comprising multiple processing cores, the reward defined as a rate of change in speedup of execution time of each of the ANN tasks over a change in resources for executing each of the ANN tasks;

allocating a set of processing cores of the multiple processing cores to execute each of the ANN tasks based on the reward; and executing operations using the set of processing cores allocated to perform the ANN tasks.

2. The processor-implemented method of claim 1, in which the set of processing cores for each ANN task is allocated according to descending order of a corresponding reward.

3. The processor-implemented method of claim 1, in which each of the ANN tasks includes a partial workload having a set of dependent operations.

4. The processor-implemented method of claim 1, further comprising:

determining for each of the ANN tasks, a set of speedup values, the speedup values corresponding to a reduction in execution time above a baseline execution time for unit increases in processing cores of the multiple processing cores; and determining a reward function for each of the ANN tasks by applying curve fitting processing using the set of speedup values.

5. The processor-implemented method of claim 1, in which ANN tasks are executed concurrently.

6. An apparatus for operating an artificial neural network (ANN), the apparatus comprising:

at least one memory; and at least one processor coupled to the at least one memory, the at least one processor being configured:

to quantify a reward for executing ANN tasks in a system having resources comprising multiple processing cores, the reward defined as a rate of change in speedup of execution time of each of the ANN tasks over a change in resources for executing each of the ANN tasks;

to allocate a set of processing cores of the multiple processing cores to execute each of the ANN tasks based on the reward; and to execute operations using the set of processing cores allocated to perform the ANN tasks.

7. The apparatus of claim 6, in which the at least one processor is further configured to allocate the set of processing cores for each ANN task according to descending order of a corresponding reward.

8. The apparatus of claim 6, in which each of the ANN tasks includes a partial workload having a set of dependent operations.

9. The apparatus of claim 6, in which the at least one processor is further configured:

to determine for each of the ANN tasks, a set of speedup values, the speedup values corresponding to a reduction in execution time above a baseline execution time for unit increases in processing cores of the multiple processing cores; and to determine a reward function for each of the ANN tasks by applying curve fitting processing using the set of speedup values.

10. The apparatus of claim 6, in which ANN tasks are executed concurrently.

11. An apparatus for operating an artificial neural network (ANN), the apparatus comprising:

means for quantifying a reward for executing ANN tasks in a system having resources comprising multiple processing cores, the reward defined as a rate of change in speedup of execution time of each of the ANN tasks over a change in resources for executing each of the ANN tasks;

means for allocating a set of processing cores of the multiple processing cores to execute each of the ANN tasks based on the reward; and means for executing operations using the set of processing cores allocated to perform the ANN tasks.

12. The apparatus of claim 11, further comprising means for allocating the set of processing cores for each ANN task according to a descending order of a corresponding reward.

13. The apparatus of claim 11, in which each of the ANN tasks includes a partial workload having a set of dependent operations.

14. The apparatus of claim 11, further comprising:

means for determining for each of the ANN tasks, a set of speedup values, the speedup values corresponding to a reduction in execution time above a baseline execution time for unit increases in processing cores of the multiple processing cores; and means for determining a reward function for each of the ANN tasks by applying curve fitting processing using the set of speedup values.

15. The apparatus of claim 11, in which ANN tasks are executed concurrently.

* * * * *